US006065856A

United States Patent [19]

Hiramatsu et al.

[11] Patent Number: 6,065,856

[45] Date of Patent: May 23, 2000

[54] VEHICLE LAMP

[75] Inventors: Takahiro Hiramatsu; Masahito Naganawa, both of Shizuoka, Japan

[73] Assignee: Koito Manufacturing Co., Ltd., Tokyo, Japan

[21] Appl. No.: 09/226,129

[22] Filed: Jan. 7, 1999

[30] Foreign Application Priority Data

Jan. 13, 1998 [JP] Japan .................................. 10-018102

[51] Int. Cl.[7] ............................... F21V 29/00; B60Q 1/04

[52] U.S. Cl. ............................................. 362/547; 294/345

[58] Field of Search .............................. 362/96, 294, 345, 362/373, 547

[56] References Cited

U.S. PATENT DOCUMENTS

| | | | |
|---|---|---|---|
| 4,862,337 | 8/1989 | Ohshio et al. | 362/294 |
| 5,497,308 | 3/1996 | Ohtsuka et al. | 362/294 |
| 5,541,821 | 7/1996 | Murakami | 362/294 |
| 5,609,407 | 3/1997 | Yanagihara et al. | 362/61 |
| 5,743,630 | 4/1998 | Yanagihara et al. | 362/547 |

*Primary Examiner*—Y. Quach
*Attorney, Agent, or Firm*—Sughrue, Mion, Zinn Macpeak & Seas, PLLC

[57] ABSTRACT

An air hole 20 substantially longitudinally passing through a reflector 12 is formed so that it is opened in the substantially uppermost end portion of the reflective surface 12*a* of the reflector 12. As an upper wall surface 12*b* is formed on the upper side of the reflective surface 12*a*, the air hole 20 is prevented from being seen through a lens 14. Moreover, an extended air-hole forming portion 22 for use in forming a substantially L-shaped air hole which is bent downward from the rear end portion of the air hole 20 is integrally formed with the reflector 12, whereby a rubber tube that has heretofore been employed can be dispensed with to ensure that the lamp cost is made reducible. Furthermore, an annular rib 24 surrounding the opening 22*a* of the extended air-hole forming portion 22 is formed on the back of the reflector 12 and the upper end wall portion 24*a* of the annular rib 24 is formed in such a manner as to cross the extended air-hole forming portion 22, which has the effect of preventing waterdrops and the like flowing down on the surface of the extended air-hole forming portion 22 from penetrating through the air hole 20.

4 Claims, 4 Drawing Sheets

VEHICLE LAMP

BACKGROUND OF THE INVENTION

1. Field of the Invention

The present invention relates to a vehicle lamp formed with an air hole bored in a reflector.

2. Description of the Related Art

Vehicle lamps are generally provided with air holes for use in preventing the insides of lamp chambers from fogging and condensation. In the case of a vehicle lamp whose lamp chamber is formed with a reflector and a lens, such an air hole is often formed as a through-hole longitudinally passing through the reflector.

As shown in FIGS. 4 and 5, a vehicle lamp 100 equipped with an air hole 102 like that is adapted to prevent waterdrops and dust from penetrating through the air hole 102 by mounting a rubber tube 104 in the rear end portion of the air hole 102. However, the conventional vehicle lamp equipped with the aforesaid air hole presents the following problems.

Since the air hole 102 is so formed as to open in the reflective surface 106*a* of a reflector 106, the air hole 102 is seen through a lens 108 when an elevational view of the lamp is taken and the problem is that it looks less attractive.

Another problem also arises from raising the lamp cost to the extent of parts cost and mounting expenses because the rubber tube 104 needs mounting.

SUMMARY OF THE INVENTION

An object of the present invention made under the aforesaid circumstances is to provide a vehicle lamp capable of realizing an inexpensive air-hole structure without making the lamp look less attractive.

In order to accomplish the object above, it has been contrived to provide an ideal air-hole forming position as well as a superb air-hole structure according to the present invention.

According to the present invention, a vehicle lamp comprising a reflector having a reflective surface for reflecting light from a light source bulb forward and an upper wall surface positioned on the upper side of the reflective surface, and a lens provided on the front side of the reflector, a lamp chamber being formed with the reflector and the lens, the reflector including an air hole which is substantially longitudinally passed through the reflector and used for communicating a space inside the lamp chamber with an external space, is characterized in that the air hole is bored in the substantially upper end portion of the reflective surface in such a manner that, an extended air-hole forming portion for use in forming a substantially L-shaped air hole bent downward from the rear end portion of the air hole is integrally formed with the reflector.

Kinds of the aforesaid vehicle lamps are not limited but may be head lamps beacon lamps or any other lamp.

DESCRIPTION OF THE PREFERRED EMBODIMENTS

As shown in the aforesaid structure, the vehicle lamp according to the present invention is such that since the air hole formed in the reflector is bored in the substantially upper end portion of the reflective surface of the reflector, the air hole is prevented from being seen through the lens when the lamp is observed. In other words, though the lamp is normally observed slantwise from the upper side, the upper wall surface formed on the upper side of the reflective surface makes hardly visible the air hole opened in the substantially upper end portion of the reflective surface.

As the extended air-hole forming portion used to extend the air hole so as to form the substantially L-shaped air hole which is bent downward from the rear end portion of the air hole is integrally formed with the reflector, the rubber tube that has heretofore been employed can be dispensed with, whereby the reduction of the lamp cost can be made feasible.

Thus, it is possible to realize an inexpensive air-hole structure without making the lamp look less attractive.

Furthermore, the air hole opened in the substantially upper end portion of the reflective surface has the following function/working-effect. More specifically, a convection current is generated in the lamp chamber because of the heat of the light source bulb and the heat caused to ascend from the light source bulb strikes against the upper wall surface of the reflector at this time and is efficiently discharged via the air hole into the external space. Consequently, the heat radiation effect of the lamp can also be increased according to the present invention.

In addition to the aforesaid structure, the formation of not only an annular rib surrounding the opening of the extended air-hole forming portion on the back of the reflector but also the upper end wall portion of the annular rib in such a manner as to cross the extended air-hole forming portion has the following function/working-effect.

Although the formation of the annular rib results in effectively preventing waterdrops and the like from penetrating through the air hole, the formation of the upper end wall portion of the annular rib in such a manner as to cross the extended air-hole forming portion also results in more effectively preventing waterdrops and the like flowing down on the surface of the extended air-hole forming portion from penetrating therethrough.

Figure 4:
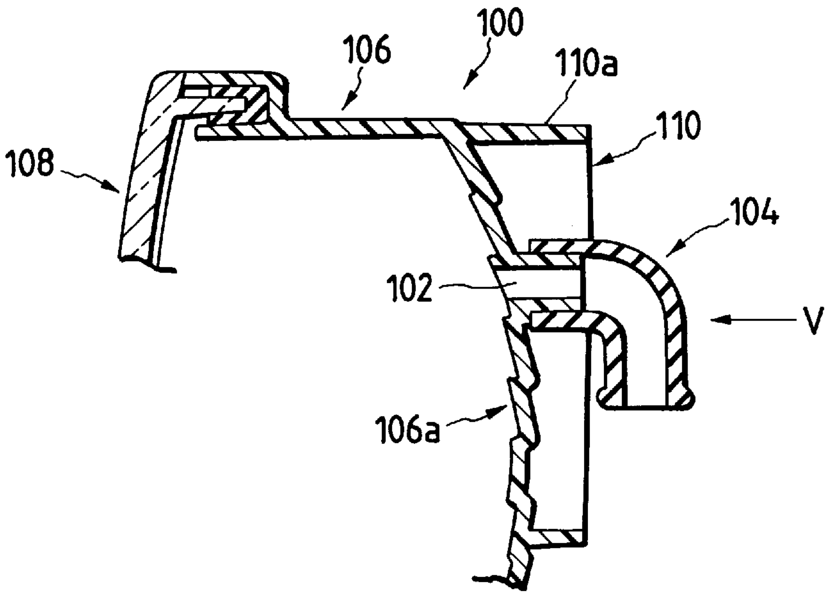
FIG. 4 PRIOR ART
FIG. 4 is a sectional view of an essential portion of a conventional vehicle lamp.
Figure 5:
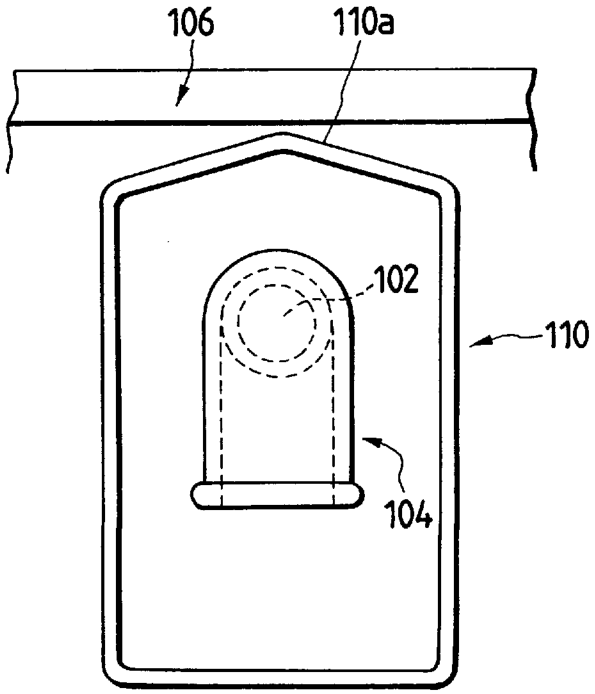
FIG. 5 PRIOR ART
FIG. 5 is an arrow diagram in the direction of V of FIG. 4.

As shown in FIGS. 4 and 5, moreover, the conventional air-hole structure of the rubber-tube mounting type will necessitate the formation of the upper end wall portion 110*a* of an annular rib 110 in a position above the air hole 102 if it is attempted to form the annular rib 110 like the aforesaid annular rib on the back of the reflector 106. Therefore, the air hole 102 is impossible to form in such a manner as to open in the substantially upper end portion of the reflective surface 106*a* of the reflector 106. However, the annular rib is formable in addition to the provision of the air hole in the substantially upper end portion of the reflective surface of the reflector according to the present invention.

Although the height, arranging configuration and specific structure of the "annular rib" are not restrictive but it may be arranged so as to prevent waterdrops and the like from penetrating through the air hole without unnecessarily increasing the height of the annular rib by tilting the rear end edge of the annular rib toward the front side from the upper end up to the lower end when a side view of the vehicle lamp is taken.

An embodiment of the present invention will subsequently be described with reference to the drawings.

Figure 1:
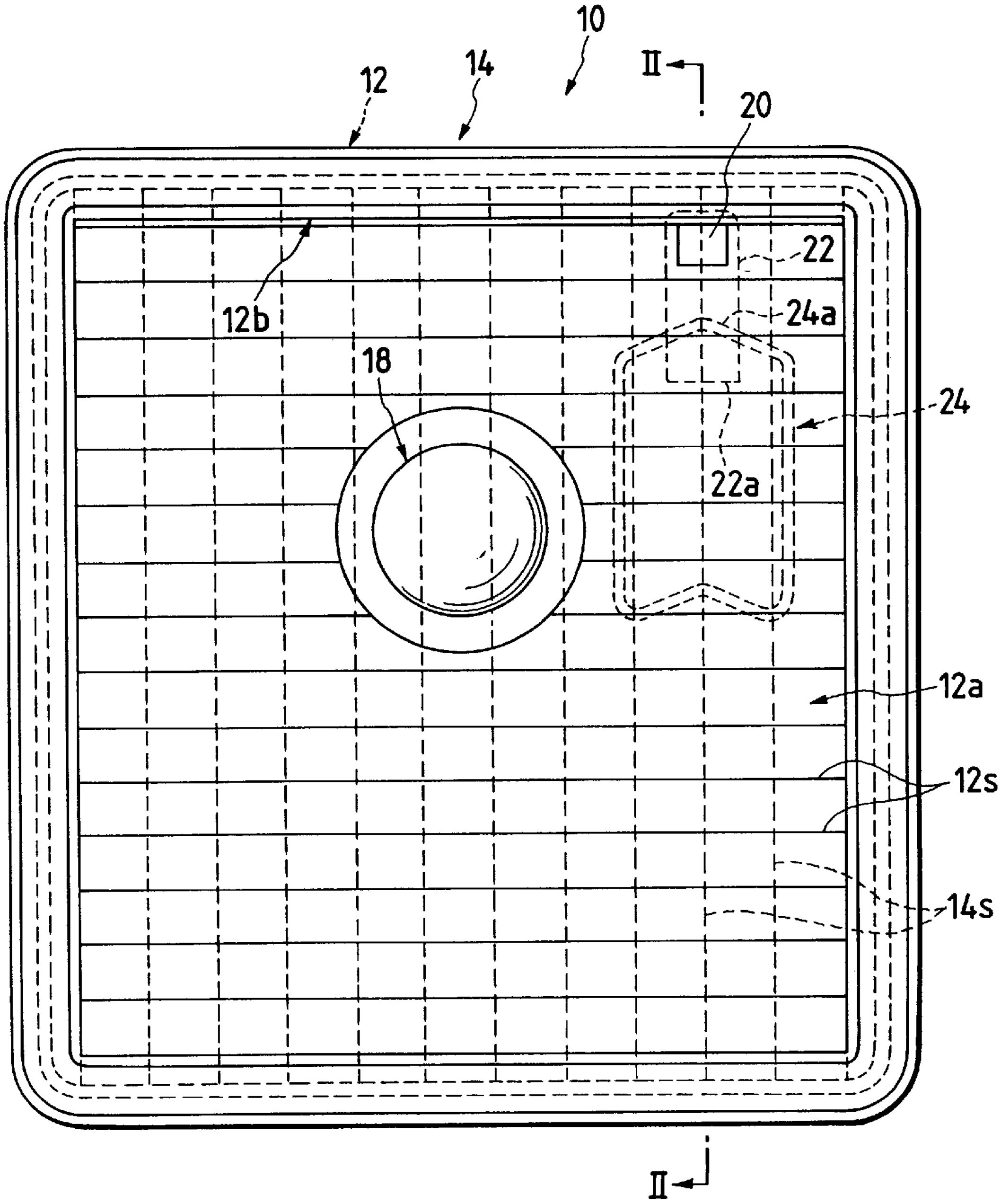
FIG. 1 is an elevational view of a vehicle lamp embodying the present invention.
Figure 2:
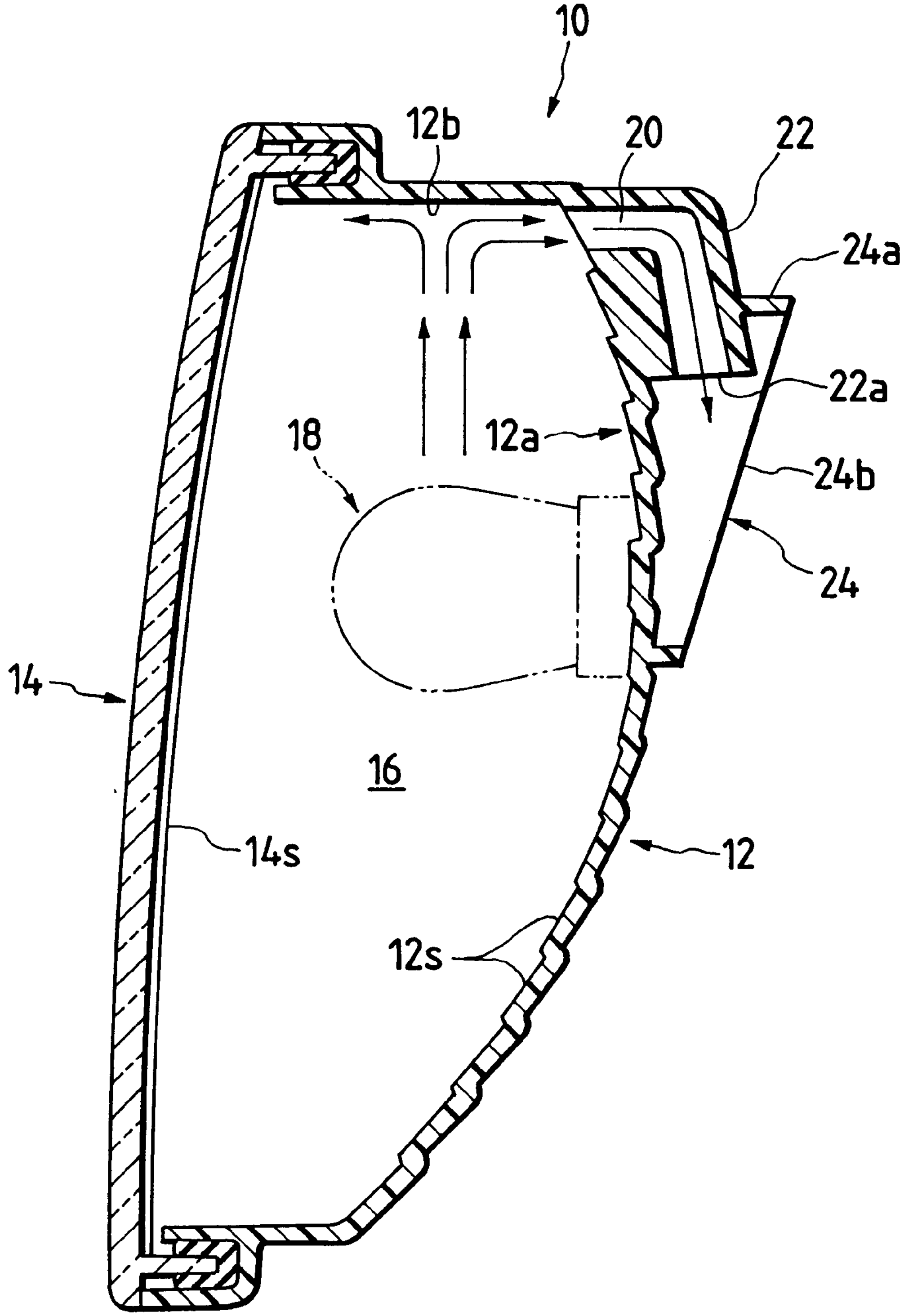
FIG. 2 is a sectional view taken on line II—II of FIG. 1.
Figure 3:
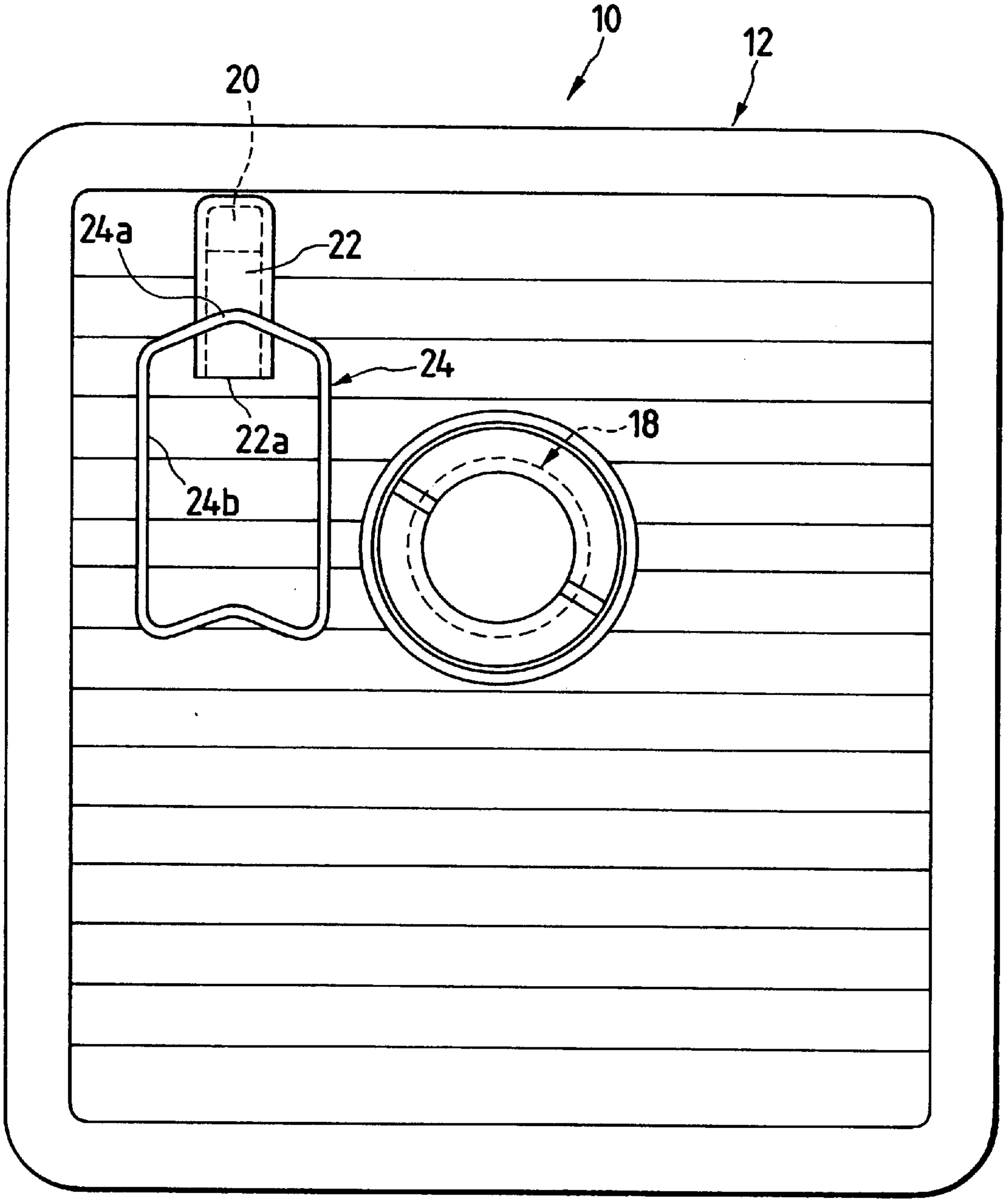
FIG. 3 is a rear elevational view of the vehicle lamp.

FIG. 1 is an elevational view of a vehicle lamp embodying the present invention; FIG. 2, a sectional view taken on line II—II of FIG. 1; and FIG. 3, a rear elevational view of the vehicle lamp.

As shown in these drawings, a vehicle lamp 10 embodying the present invention is a tail/stop lamp which is so configured as to form a lamp chamber 16 with a reflector 12 and a lens 14 provided in front of the reflector 12 (provided in front thereof as one of the lamp fittings but positioned in the rear of a vehicle body and this applies hereinafter).

The reflector 12 is provided with a reflective surface 12*a* for reflecting light from a light source bulb 18, and an upper wall surface 12*b* positioned on the upper side of the reflective surface 12*a*. A plurality of horizontally-striped reflective surface elements 12*s* are formed on the reflective surface 12*a*. Furthermore, a plurality of vertically-striped lens elements 14s are formed on the inner face of the lens 14.

An air hole 20 which is substantially longitudinally passed through the reflector 12 and used for communicating a space inside the lamp chamber 16 with an external space is formed in such a manner as to open substantially uppermost end portion of the reflective surface 12*a* of the reflector 12. Furthermore, an extended air-hole forming portion 22 for use in forming a substantially L-shaped air hole which is bent downward from the rear end portion of the air hole 20 is integrally formed with the reflector 12.

An annular rib 24 surrounding the opening 22*a* of the extended air-hole forming portion 22 is formed on the back of the reflector 12. The upper end wall portion 24*a* of the annular rib 24 is formed in the form of a roof crossing the intermediate region of the extended air-hole forming portion 22. The rear end edge 24*b* of the annular rib 24 is formed in such a manner as to tilt toward the front side from the upper end up to the lower end when a side view of the lamp is taken.

As described in detail, the vehicle lamp 10 according to this embodiment of the invention has the air hole 20 formed in the reflector 12 and opened in substantially uppermost end portion of the reflective surface 12*a* of the reflector 12, whereby to prevent the air hole 20 from being seen through the lens 14 when the lamp is observed. In other words, though the lamp is normally observed slantwise from the upper side, the upper wall surface 12*b* formed on the upper side of the reflective surface 12*a* makes hardly visible the air hole 20 opened in the substantially upper end portion of the reflective surface 12*a*.

As the extended air-hole forming portion 22 used to extend the air hole 20 so as to form the substantially L-shaped air hole which is bent downward from the rear end portion of the air hole 20 is integrally formed with the reflector 12, a rubber tube that has heretofore been employed can be dispensed with, whereby the lamp cost is made reducible.

Thus, it is possible to realize an inexpensive air-hole structure without making the lamp look less attractive according to this embodiment of the invention.

Furthermore, since the air hole 20 is opened in the substantially upper end portion of the reflective surface 12*a*, the heat generated by the light source bulb 18 and caused to ascend strikes against the upper wall surface 12*b* of the reflector 12 and is discharged via the air hole 20 into the external space with efficiency. Consequently, the heat radiation effect of the lamp can also be increased according to this embodiment of the invention.

Moreover, the annular rib 24 surrounding the opening 22*a* of the extended air-hole forming portion 22 is formed on the back of the reflector 12 and the upper end wall portion 24*a* of the annular rib 24 is formed in such a manner as to cross the extended air-hole forming portion 22 with the effect of preventing not only waterdrops and the like from penetrating through the air hole 20 but also waterdrops and the like flowing down on the surface of the extended air-hole forming portion 22 because of the upper end wall portion 24*a* of the annular rib 24. While the air hole 20 is kept securely open in the substantially uppermost end portion of the reflective surface 12*a* of the reflector 12, the annular rib 24 can be formed at this time.

Furthermore, since the rear end edge 24*b* of the annular rib 24 is tilted toward the front side from the upper end up to the lower end when a side view of the vehicle lamp is taken, waterdrops and the like are prevented from penetrating through the air hole 20 without unnecessarily increasing the height of the annular rib 24.

What is claimed is:

1. A vehicle lamp, comprising:

a reflector having a reflective surface for reflecting light from a light source bulb in a forward direction and an upper wall surface positioned on an upper side of the reflective surface;

a lens provided on a front side of the reflector;

a lamp chamber being formed by the reflector and the lens;

an air hole which is substantially longitudinally passed through the reflector and which communicates a space inside of the lamp chamber with an external space, wherein the air hole is bored in an upper end portion of the reflective surface at a junction of the upper wall surface and the upper end portion; and an extended air hole forming portion forming a substantially L-shaped air hole which is bent downward from a rear end portion of said air hole, and being integrally formed with the reflector.

2. A vehicle lamp, comprising:

a reflector having a reflective surface for reflecting light from a light source bulb in a forward direction and an upper wall surface positioned on an upper side of the reflective surface;

a lens provided on a front side of the reflector;

a lamp chamber being formed by the reflector and the lens;

an air hole which is substantially longitudinally passed through the reflector and used for communicating a space inside of the lamp chamber with an external space, wherein the air hole is bored in an upper end portion of the reflective surface; and an extended air-hole forming portion forming a substantially L-shaped air hole which is bent downward from a rear end portion of said air hole, and being integrally formed with the reflector, wherein an annular rib surrounding an external opening of said extended air-hole forming portion is formed on a back of the reflector; and an upper end wall portion of said annular rib is formed in such a manner as to cross over said extended air-hole forming portion.

3. The vehicle lamp according to claim 2, wherein a rear end edge of said annular rib is tilted toward a front side of the vehicle lamp from an upper end of the rear end edge to a lower end thereof from a side view of the vehicle lamp.

4. The vehicle lamp according to claim 1, wherein said air hole passes through a back wall of the reflector.

* * * * *